(12) United States Patent
Mizutani et al.

(10) Patent No.: US 9,276,466 B2
(45) Date of Patent: Mar. 1, 2016

(54) SWITCHING POWER SUPPLY CIRCUIT AND CONTROL METHOD THEREFOR

(75) Inventors: Koichi Mizutani, Toyota (JP); Kouichi Yamanoue, Hiroshima (JP)

(73) Assignees: TOYOTA JIDOSHA KABUSHIKI KAISHA, Aichi-ken (JP); VISTEON GLOBAL TECHNOLOGIES, INC MI (US)

( * ) Notice: Subject to any disclaimer, the term of this patent is extended or adjusted under 35 U.S.C. 154(b) by 440 days.

(21) Appl. No.: 13/583,991

(22) PCT Filed: Mar. 9, 2011

(86) PCT No.: PCT/IB2011/000508
§ 371 (c)(1),
(2), (4) Date: Oct. 31, 2012

(87) PCT Pub. No.: WO2011/110933
PCT Pub. Date: Sep. 15, 2011

(65) Prior Publication Data
US 2013/0049717 A1    Feb. 28, 2013

(30) Foreign Application Priority Data
Mar. 11, 2010    (JP) .................................. 2010-054902

(51) Int. Cl.
*G05F 1/00*    (2006.01)
*H02M 3/156*    (2006.01)

(52) U.S. Cl.
CPC ...................................... *H02M 3/156* (2013.01)

(58) Field of Classification Search
USPC ............................ 323/222, 271, 282–285, 299
See application file for complete search history.

(56) References Cited

U.S. PATENT DOCUMENTS

| | | | |
|---|---|---|---|
| 7,145,316 B1 | 12/2006 | Galinski, III | |
| 7,180,274 B2 * | 2/2007 | Chen et al. | 323/222 |
| 7,508,181 B2 * | 3/2009 | Chen et al. | 323/282 |
| 2006/0055574 A1 | 3/2006 | Maksimovic et al. | |

(Continued)

FOREIGN PATENT DOCUMENTS

| | | |
|---|---|---|
| EP | 1 148 614 A2 | 10/2001 |
| JP | 61-000993 B2 | 1/1986 |
| JP | 10-127047 A | 5/1998 |

(Continued)

OTHER PUBLICATIONS

International Search Report and Written Opinion for corresponding International Patent Application No. PCT/ib2011/000508 mailed Sep. 9, 2011.

(Continued)

*Primary Examiner* — Nguyen Tran
(74) *Attorney, Agent, or Firm* — Sughrue Mion, PLLC (57) ABSTRACT

A switching power supply circuit includes a PWM drive circuit (12) that performs the PWM driving of a switching element (Q1) at a duty ratio (D) commensurate with an input target voltage (VS), and generates from an input voltage (VB) an output voltage (VTL) whose target value is the target voltage (VS), by the PWM drive circuit (12) driving the switching element (Q1). The switching power supply circuit further includes a control circuit (13) and a target voltage limiting circuit (14) that together fix the duty ratio (D) regardless of the target voltage (VS), when a difference between the input voltage (VB) and the target voltage (VS) is less than or equal to a predetermined constant value ($\alpha$).

11 Claims, 5 Drawing Sheets

(56) References Cited

U.S. PATENT DOCUMENTS

2007/0108952 A1 5/2007 Bartolo et al.
2011/0127981 A1* 6/2011 Miyamae ................ 323/282

FOREIGN PATENT DOCUMENTS

| JP | 2003-274648 A | 9/2003 |
| JP | 2003-333839 A | 11/2003 |
| JP | 2005-117828 A | 4/2005 |
| JP | 2006-054969 A | 2/2006 |
| JP | 2007-159176 A | 6/2007 |
| JP | 2009-033883 A | 2/2009 |
| JP | 2010-136510 A | 6/2010 |
| WO | 00/67366 A1 | 11/2000 |
| WO | 2009033924 A2 | 3/2009 |

OTHER PUBLICATIONS

Japanese Office Action for corresponding JP Patent Application No. JP 2010-054902 issued on Jan. 17, 2012.
Partial translation of the Communication dated Jul. 23, 2014, issued by the State Intellectual Property Office of the People's Republic of China in corresponding Chinese Application No. 201180013477.8.

* cited by examiner

SWITCHING POWER SUPPLY CIRCUIT AND CONTROL METHOD THEREFOR

BACKGROUND OF THE INVENTION

1. Field of the Invention

The invention relates to a switching power supply circuit and a control method therefor that generates from an input voltage an output voltage whose target value is a target voltage by driving a switching element at a duty ratio commensurate with the target voltage.

2. Description of the Related Art

As a related-art technology, there exists an electric power supply device that receives a DC input voltage through an input terminal and outputs a lowered DC output voltage from an output terminal (see, e.g., Japanese Patent Application Publication No. 2007-159176 (JP-A-2007-159176)). This electric power supply device has: a pulse width modulation oscillator that performs pulse width modulation (PWM) of an output of an error amplifier; a drive circuit that generates a drive signal from a pulse signal received from the pulse width modulation oscillator; and a pair of power semiconductor switching elements that generates a DC output voltage by lowering the DC input voltage on the basis of the drive signal from the drive circuit.

Figure 1:
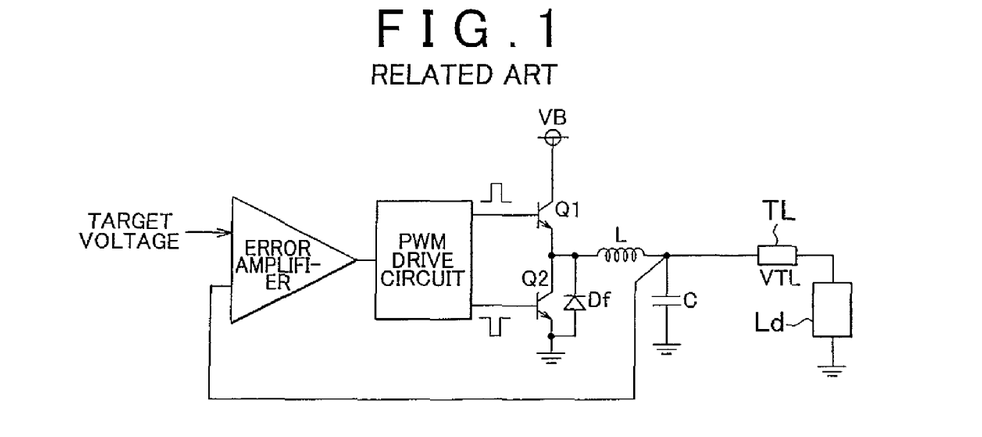
FIG. 1 is a block diagram showing a switching power supply circuit of a related art.
Figure 2:
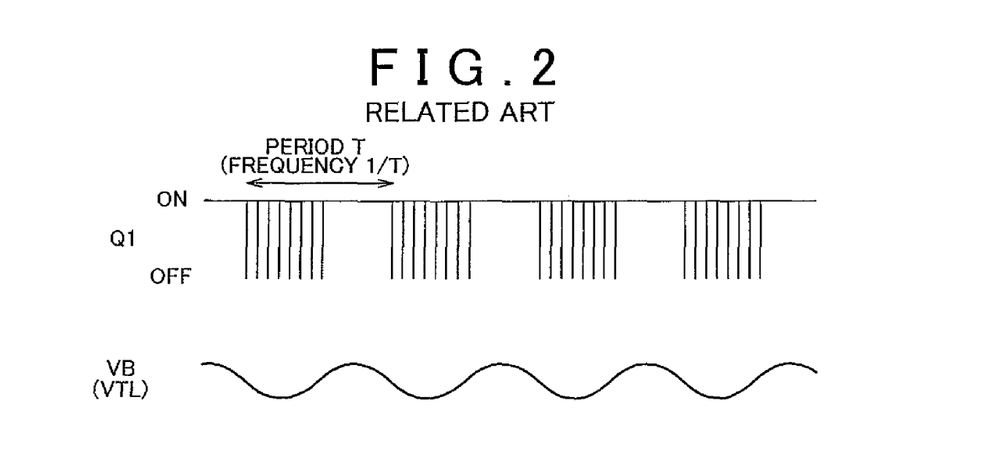
FIG. 2 is a diagram showing the state of operation of a switching element shown in FIG. 1 and a ripple component of the input voltage (or the output voltage)

By the way, in a switching power supply circuit as shown in FIG. 1 which controls an output voltage VTL to a target voltage by switching an input voltage VB, when the target voltage of the output voltage VTL and the input voltage VB are close to each other and therefore the input voltage VB and the output voltage VTL are substantially equal, there sometimes occur alternate repetitions of a continuous on-state period during which an on-state of a switching element Q1 continues and a switching period during which the on-off switching of the switching element Q1 at certain duty ratio continues. This repetition phenomenon occurs periodically as shown in FIG. 2, so that harmonic noise whose fundamental wave has a repetition period T (frequency 1/T) occurs. The repetition frequency VT is determined by, for example, a delay time of a feedback loop that includes an error amplifier (which time includes a phase compensation factor for preventing oscillation), or the like, and sometimes becomes several hundred kHz.

A reason for the occurrence of such a repetition phenomenon is that due to the characteristics of electronic component parts used, the circuit delay times, etc., there is a limit to the minimum pulse width of the PWM signal (duty signal) that the PWM drive circuit outputs.

For example, in the case where a voltage slightly lower than the input voltage VB is set as a target voltage of the output voltage VTL, the actual duty ratio that can be output at the time of the minimum pulse width is about 99% where the theoretical duty ratio (duty value) of the PWM signal for driving the switching element Q1 is, for example, 99.999%. Therefore, when the switching element Q1 is PWM-driven at a duty ratio of 99%, the target voltage is greater than the output voltage VTL (target voltage>output voltage VTL). Hence, if the PWM drive circuit is operated to further increase the duty ratio, the duty ratio is fixed at 100%, so that the switching element Q1 reaches a complete on-state. However, if the switching element Q1 reaches the complete on-state, the target voltage is less than the output voltage VTL (target value<output voltage VTL). Therefore, the PWM drive circuit operates so as to lower the duty ratio of the PWM signal. Hence, the state of operation of the switching element Q1 becomes a state of alternate repetitions of a period during which the switching element Q1 is continuously on and a period during which the switching element Q1 switches on and off at a certain duty ratio.

Besides, when the voltage difference between the target voltage of the output voltage VTL and the input voltage VB becomes very small due to fluctuations of the input voltage VB, the two states, that is, the continuous on-state and the switching state, are sometimes alternately repeated as well.

In some cases, the repeated actions induce a current ripple in a wiring (harness), such as an input wiring of the input voltage VB, an output wiring of the output voltage VTL, etc.

SUMMARY OF THE INVENTION

The invention provides a switching power supply circuit and a control method therefor capable of restraining the occurrence of noise even when the voltage difference between the target voltage of the output voltage and the input voltage is small.

A first aspect of the invention relates to a switching power supply circuit that includes drive means for driving a switching element at a duty ratio commensurate with a target voltage, and that generates from an input voltage an output voltage whose target value is the target voltage, by the drive means driving the switching element. The switching power supply circuit includes fixation means for fixing the duty ratio regardless of the target voltage, when a difference between the input voltage and the target voltage is less than or equal to a predetermined set value.

In the foregoing aspect of the invention, the fixation means may fix the duty ratio at such a value that the difference between the input voltage and the output voltage converges to a constant value that is less than or equal to the predetermined set value.

In the foregoing aspect, the constant value may be equal to the predetermined set value.

In the foregoing aspect, the constant value may be equal to zero.

In the foregoing aspect, the upper limit of the output voltage may converge to a value obtained by subtracting the constant value (α) from the input voltage.

In the foregoing aspect, the switching power supply circuit may further include an inductor connected to the switching element.

In the foregoing aspect, the switching element may be disposed at a high side in the switching power supply circuit, and the switching power supply circuit may further include a second switching element disposed at a low side in the switching power supply circuit. The inductor is connected to a connection between the switching element and the second switching element.

In the foregoing aspect, the fixation means may fix the duty ratio regardless of the target voltage, when the difference between the input voltage and the target voltage is substantially zero.

In the foregoing aspect, the duty ratio may be determined according to an error between a feedback value based on the output voltage and an input value based on the target voltage. The fixation means may fix the duty ratio by adjusting the input value regardless of the target voltage.

A second aspect of the invention relates to a control method for a switching power supply circuit that includes drive means for driving a switching element at a duty ratio commensurate with a target voltage, and that generates from an input voltage an output voltage whose target value is the target voltage, by the drive means driving the switching element. The control method includes fixing the duty ratio regardless of the target voltage, when a difference between the input voltage and the target voltage is less than or equal to a predetermined set value.

According to the foregoing aspects of the invention, occurrence of noise can be restrained even when the voltage difference between the target voltage of the output voltage and the input voltage is small.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a diagram showing a state in which the switching element is continuously on;

DETAILED DESCRIPTION OF EMBODIMENTS

Figure 3:
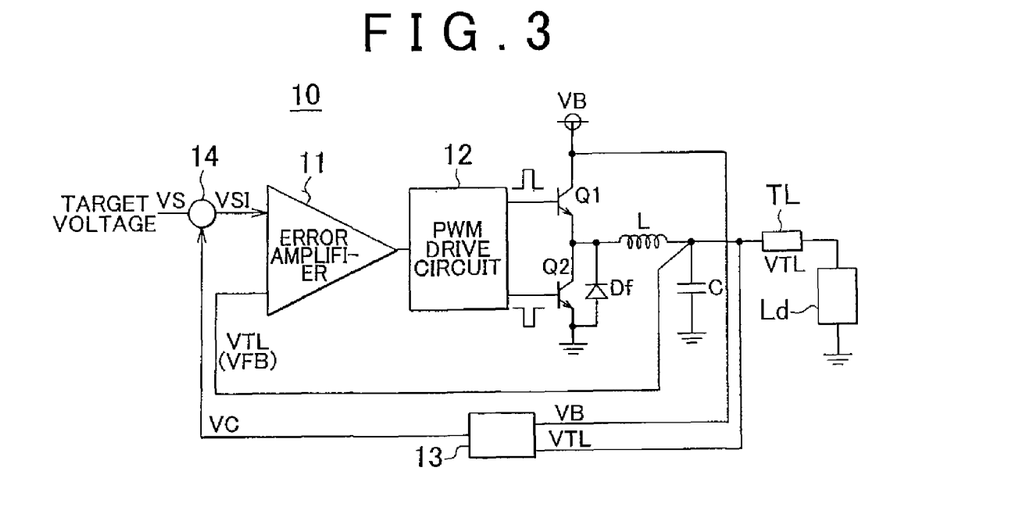
FIG. 3 is a diagram showing a construction of a step-down (i.e., voltage step-down) switching power supply circuit as a first embodiment of the switching power supply circuit of the invention.

With reference to the drawings, forms for carrying out the invention will be described below. FIG. 3 is a diagram showing a construction of a step-down (i.e., voltage step-down) switching power supply circuit 10 as a first embodiment of the switching power supply circuit of the invention. The step-down switching power supply circuit 10 is an electric power supply device that generates from an input voltage VB an output voltage VTL whose target value is a target voltage VS that is input as a command value from outside, by performing the PWM driving of a switching element Q1 at a duty ratio D commensurate with the target voltage VS.

The step-down switching power supply circuit 10 is equipped with a PWM drive circuit 12 as drive means for PWM-driving the switching element Q1 at the duty ratio D that is determined according to an error ERR between a feedback value VFB based on the output voltage VTL (VFB is equal to VTL in the case shown in FIG. 1) and an input value VSI based on the target voltage VS. Besides, the step-down switching power supply circuit 10 is also equipped with a control circuit 13, a target voltage limiting circuit 14 and an error amplifier 11 which function as fixation means for fixing the duty ratio D by adjusting the input value VSI regardless of the target voltage VS when a difference between the input voltage VB and the target voltage VS is less than or equal to a predetermined small set value Vth (i.e., when the input voltage VB and the target voltage VS are substantially equal to each other), for example, when the difference is substantially zero, while the switching element Q1 is being driven by the PWM drive circuit 12. That is, the fixation means performs such a control as to keep the duty ratio D from changing despite changes in the target voltage VS given from outside while the difference between the input voltage VB and the target voltage VS is less than or equal to the predetermined set value Vth.

Figure 4:
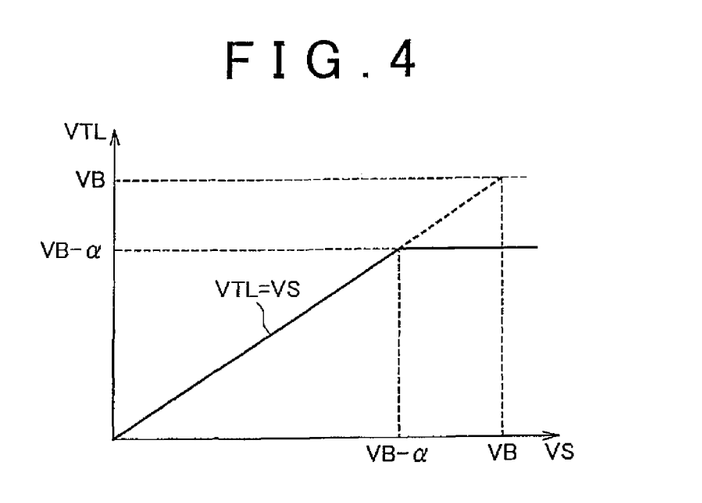
FIG. 4 is a diagram showing a relation between the target voltage and the output voltage.

In the step-down switching power supply circuit 10, which has constructions as described above, the input voltage VB is converted in voltage to generate an output voltage VTL that is substantially equal to the target voltage VS (VTL=VS), by the PWM drive circuit 12 performing the PWM driving of the switching element Q1 in accordance with the target voltage VS, as shown in FIG. 4. If, due to fluctuations of at least one of the input voltage VB and the target voltage VS, the input voltage VB and the target voltage VS become so close to each other that the difference between the input voltage VB and the target voltage VS is less than or equal to the predetermined small set value Vth (=constant value α (>0)), or become equal to each other, the duty ratio D is fixed irrespective of the target voltage VS. FIG. 4 shows an example in which when a voltage difference (VB−VS) obtained by subtracting the target voltage VS from the input voltage VB is less than or equal to the constant value α, the duty ratio D is fixed at such a value that a difference (VB−VTL) obtained by subtracting the output voltage VTL from the input voltage VB is converged to the constant value α (i.e., such a value as to converge the output voltage VTL to a value (VB−α)). As for the duty ratio D, for example, the fixed value of the duty ratio D for converging the voltage difference (VB−VTL) obtained by subtracting the output voltage VTL from the input voltage VB to the constant value α is set at 99%, taking into account the limit of the minimum pulse width of the PWM signal due to the characteristics of circuit component parts, and the like.

That is, even when a target voltage VS that is larger than the value (VB−α) (or a target voltage VS greater than or equal to the input voltage VB) is input from outside, the duty ratio D is fixed at such a value as to converge the output voltage VTL to the value (VB−α), so that alternate repetitions of the continuous on-state and the switching state of the switching element Q1 can be prevented. In consequence, since the occurrence of the repetition phenomenon is thus avoided, current ripple is not induced in the harness, such as the input wiring for the input voltage VB; the output wiring for the output voltage VTL, etc. Thus, occurrence of noise can be restrained.

Next, the construction of the step-down switching power supply circuit 10 shown in FIG. 3 will be described more in detail. The step-down switching power supply circuit 10 is an electric power supply device that supplies electric power to a load Ld by using the input voltage VB that is input from a power input terminal as a reference power supply voltage. The step-down switching power supply circuit 10 is a so-called step-down switching regulator that outputs a constant output voltage VTL obtained through step-down voltage conversion of the input voltage VB from the reference power supply to the load Ld, via an output terminal TL, in accordance with a demanded target voltage VS, despite fluctuations of the input voltage VB or the consumption of current of the load Ld (load current).

For example, in the case where the step-down switching power supply circuit 10 is mounted in a vehicle, the supply source of the input voltage VB corresponds to a vehicle-mounted electric power supply (more concretely, a battery, a DC-DC converter, etc.), and the load Ld corresponds to a vehicle-mounted electrical load (more concretely, a microcomputer, ICs, resistance loads, electric motors, etc.).

The step-down switching power supply circuit 10 includes the error amplifier 11, the PWM drive circuit 12, the switching element Q1, an inductor L connected to the switching element Q1, an output capacitor C, a flyback diode Df, a synchronous rectification switching element Q2, the control circuit 13, and the target voltage limiting circuit 14.

The error amplifier 11 adjusts its output voltage as follows. That is, by infinitely amplifying the value of the error ERR between the feedback value VFB that corresponds to the output voltage VTL applied to the load Ld and the input value VSI that corresponds to the target value of the output voltage VTL and applying negative feedback of the infinitely amplified value of the error ERR, the error amplifier 11 adjusts the output voltage so that the feedback value VFB and the input value VSI become equal to each other. The error amplifier 11, under the negative feedback, outputs to the PWM drive circuit 12 an amplified voltage obtained by amplifying the error ERR with a predetermined amplification factor.

The PWM drive circuit 12 outputs a PWM signal that has the duty ratio D commensurate with the error ERR and that is provided for the PWM driving of the switching elements Q (Q1, Q2). For example, the PWM drive circuit 12 outputs a rectangular-wave PWM signal for driving the switching elements Q at such a duty ratio D that the output voltage VTL becomes equal to the target voltage VS, in accordance with a result of comparison between a carrier signal (e.g., a triangular waveform signal such as a ramp signal or the like) and an output voltage of the error amplifier 11. Incidentally, the generation method for the PWM signal that is generated inside the PWM drive circuit 12 does not need to be the foregoing method, but may also be a known method.

As each of the switching elements Q performs the switching operation based on the PWM signal from the PWM drive circuit 12, the input voltage VB from the reference electric power supply is lowered. Incidentally, concrete examples of the switching elements Q include semiconductor elements such as IGBTs, MOSFETs, bipolar transistors, etc.

When the high-side switching element Q1 turns on and the low-side switching element Q2 turns off on the basis of the PWM signal, current flows through the inductor L that is connected to a connection between the two switching elements Q1 and Q2, so that electricity is stored in the output capacitor C. Then, when the switching element Q1 turns off and the switching element Q2 turns on the basis of the PWM signal, current flows back through the inductor L, the output capacitor C connected to the output side of the inductor L, and the switching element Q2 so that the current having been flowing through the inductor L tends to continue to flow. Due to the foregoing switching operations, smoothed output voltage VTL is output from an output terminal TL. Incidentally, due to the provision of the switching element Q2 in parallel with a diode Df that is connected to the input side of the inductor L, the heat generation from the diode Df can be restrained. Besides, if the diode Df is provided, the flow-back of current is possible, and therefore, it is permissible to adopt a construction in which the switching element Q2 is not provided.

The control circuit 13 outputs a control voltage VC according to the voltage difference between the input voltage VB and the output voltage VTL. If the voltage difference (VB−VTL) is greater than the predetermined constant value $\alpha$ provided that the constant value $\alpha$ is a positive constant, the control circuit 13 outputs +∞ as the control voltage VC. If the voltage difference (VB−VTL) is less than or equal to the constant value $\alpha$, the control circuit 13 outputs 0 as the control voltage VC. For example, in the case where the step-down switching power supply circuit 10 is a circuit that generates from the input voltage VB of 12 V the output voltage VTL that is variable in the range of 0 to 12 V, the control circuit 13 is able to effectively avoid the phenomenon of alternate repetitions of the continuous on-state and the switching state if the constant value $\alpha$ is set at 0.5 V.

Since the control circuit 13 changes the control voltage VC according to the voltage difference (VB−VTL), the control circuit 13 may output the control voltage VC, for example, in accordance with a expression "VC=(VB−VTL−$\alpha$)×N". In this expression, N is sufficiently larger than (VB−VTL−$\alpha$). According to the expression "VC=(VB−VTL−$\alpha$)×N", if (VB−VTL)>$\alpha$ (i.e., if the output voltage VTL is less than (VB−$\alpha$)), the control voltage VC is computed to be +∞, and if (VB−VTL)=$\alpha$, the control voltage VC is computed to be 0. Although if (VB−VTL)<$\alpha$ the control voltage VC is computed to be −∞ according to the foregoing expression, the control circuit 13, due to the circuit construction, computes the control voltage VC to be 0 if (VB−VTL)<$\alpha$.

The target voltage limiting circuit 14 is means for limiting the input value VSI to or below the control voltage VC, and is a circuit that clamps the upper limit of the input value VSI to the control voltage VC. If (VB−VTL)>$\alpha$, the control voltage VC is computed to be +∞, so that the upper limit value of the input value VSI is +∞ and the input value VSI is equal to the target voltage VS (VSI=VS). On the other hand, if (VB−VTL) ≤$\alpha$, the control voltage VC is computed to be 0, so that the upper limit value of the input value VSI is 0 and the input value VSI is limited to 0 (VSI=0).

It is to be noted herein that if it is assumed that the input value VSI is limited to a value that is different from the target voltage VS (e.g., VS=10, VSI=0) by the target voltage limiting circuit 14, the voltage at the output terminal VTL is 0 V due to imaginary short circuit (virtual short circuit) between the input terminals of the error amplifier 11. Therefore, since (VB−VTL)>$\alpha$, the control voltage VC is +∞, so that no limitation is imposed on the input value VSI.

That is, since the feedback loop by the output of the control circuit 13 operates so as to restrict the upper limit of the output voltage VTL to (VB−$\alpha$) as shown in FIG. 4, the output voltage VTL always converges to (VB−$\alpha$) if the difference in the subtraction of the target voltage VS from the input voltage VB is less than or equal to the constant value $\alpha$. On the other hand, if the difference in the subtraction of the target voltage VS from the input voltage VB is greater than the constant value $\alpha$, the output voltage VTL becomes equal to the target voltage VS (VTL=VS), so that the target voltage VS is directly output as the output voltage VTL.

Thus, according to the control circuit 13 and the target voltage limiting circuit 14, when the difference in the subtraction of the target voltage VS from the input voltage VB is less than or equal to the constant value $\alpha$, a limit (upper limit) can be provided for the input value VSI, and therefore the duty ratio D can be fixed at a value (e.g., 99%) such that the output voltage VTL will be converged to (VB−$\alpha$).

Figure 5:
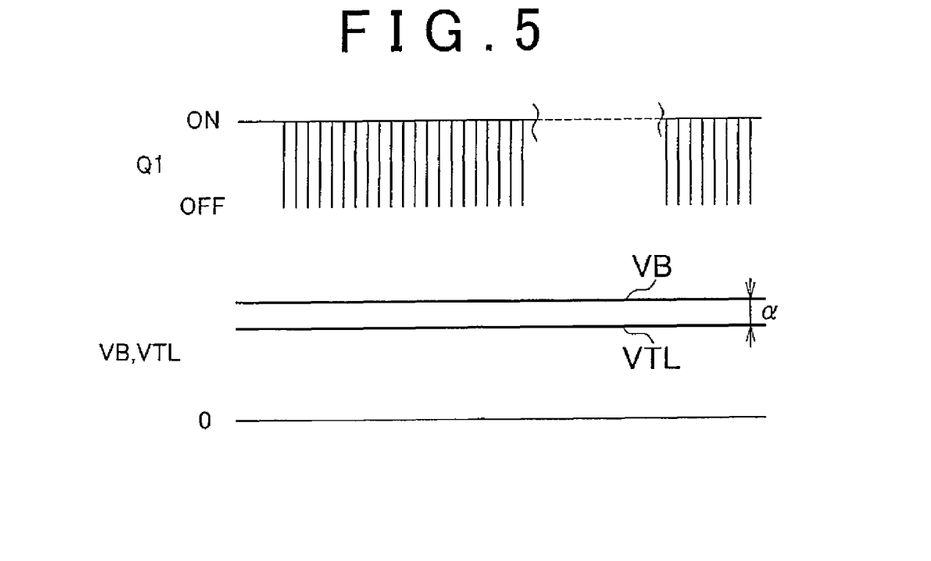
FIG. 5 is a diagram showing a state in which the switching element is undergoing switching operations at a predetermined duty ratio.

Therefore, even when there is input of such a target voltage VS that the difference in the subtraction of the target voltage VS from the input voltage VB becomes less than or equal to the constant value $\alpha$, the transistor Q1 is always switched at a duty ratio less than 100% without entering a fixed on-state, as shown in FIG. 5, because the output voltage VTL is controlled so as to be equal to (VB−$\alpha$) on that occasion. As a result, current ripple is not induced in a harness such as the input wiring for the input voltage VB, the output wiring for the output voltage VTL, etc., so that occurrence of noise can be restrained.

Figure 6:
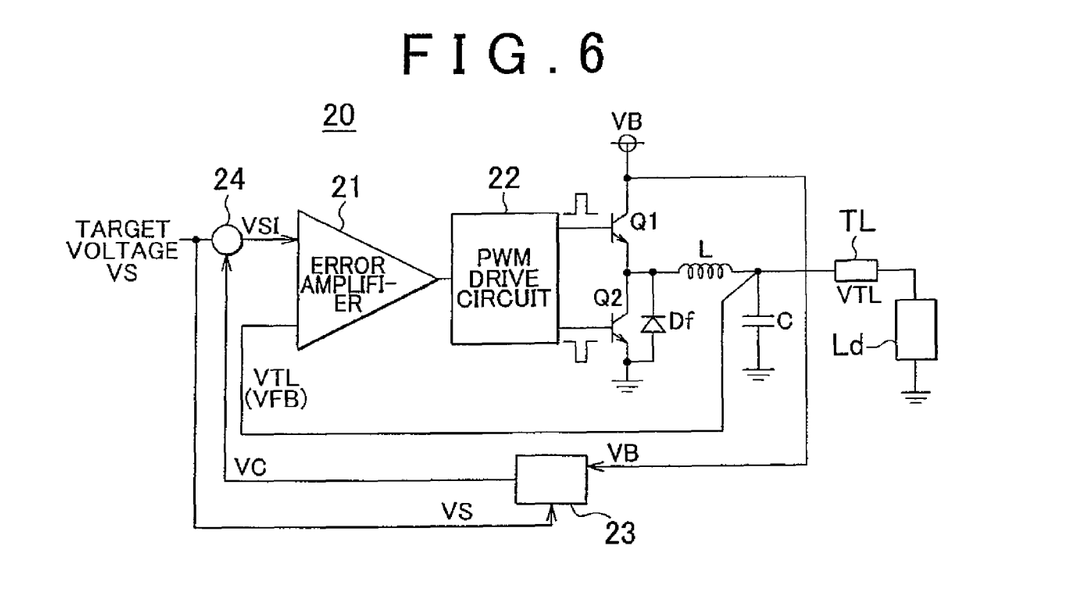
FIG. 6 is a diagram showing a construction of a step-down switching power supply circuit as a second embodiment of the switching power supply circuit of the invention.

FIG. 6 is a diagram showing a construction of a step-down switching power supply circuit 20 as a second embodiment of the switching power supply circuit of the invention. Descriptions of constructions and functions of the step-down switching power supply circuit 20 that are substantially the same as or similar to those of the step-down switching power supply circuit 10 shown in FIG. 3 will be omitted or simplified below. The step-down switching power supply circuit 20 is an electric power supply device that generates from an input voltage VB an output voltage VTL whose target value is a target voltage VS that is input as a command value from outside, by performing the PWM driving of a switching element Q1 at a duty ratio D commensurate with the target voltage VS.

The step-down switching power supply circuit 20 is equipped with a PWM drive circuit 22 that is similar to the PWM drive circuit 22 shown in FIG. 3. Besides, the step-down switching power supply circuit 20 is also equipped with a control circuit 23, an adder circuit 24 and an error amplifier 21 which function as fixation means for fixing the duty ratio D by adjusting the input value VSI regardless of the target voltage VS when a difference between the input voltage VB and the target voltage VS is less than or equal to the predetermined small set value Vth (i.e., when the input voltage VB and the target voltage VS are substantially equal to each other), for example, when the difference is substantially zero, while the switching element Q1 is being driven by the PWM drive circuit 22.

Figure 7:
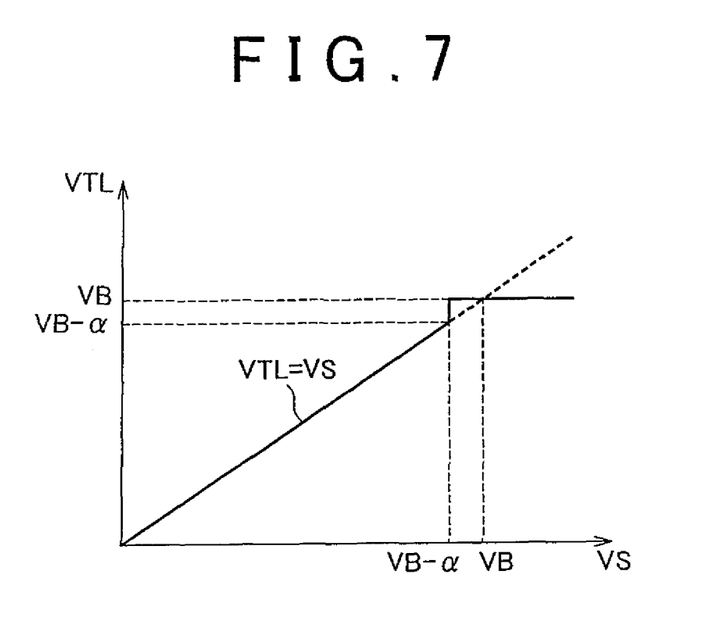
FIG. 7 is a diagram showing a relation between the target voltage and the output voltage.

In the step-down switching power supply circuit 20, which has constructions as described above, the input voltage VB is converted in voltage to generate an output voltage VTL that is substantially equal to the target voltage VS (VTL=VS), by the PWM drive circuit 22 performing the PWM driving of the switching element Q1 in accordance with the target voltage VS, as shown in FIG. 7. If, due to fluctuations of at least one of the input voltage VB and the target voltage VS, the input voltage VB and the target voltage VS become so close to each other that the difference between the input voltage VB and the target voltage VS is less than or equal to the predetermined small set value Vth (=constant value $\alpha$ (>0)), or become equal to each other, the duty ratio D is fixed irrespective of the target voltage VS. FIG. 7 shows an example in which when a voltage difference (VB−VS) obtained by subtracting the target voltage VS from the input voltage VB is less than or equal to the constant value $\alpha$, the duty ratio D is fixed at such a value that a difference (VB−VTL) obtained by subtracting the output voltage VTL from the input voltage VB is converged to the constant value $\alpha$ (i.e., such a value as to converge the output voltage VTL to the input voltage VB). As for the duty ratio D, for example, the fixed value of the duty ratio D for converging the voltage difference (VB−VTL) obtained by subtracting the output voltage VTL from the input voltage VB to zero is set at 100%, taking into account the limit of the minimum pulse width of the PWM signal due to the characteristics of circuit component parts, and the like.

That, is, even when a target voltage VS that is larger than the value (VB−$\alpha$) (or a target voltage VS greater than or equal to the input voltage VB) is input from outside, the duty ratio D is fixed at such a value as to converge the output voltage VTL to the input voltage VB, so that alternate repetitions of the continuous on-state and the switching state of the switching element Q1 can be prevented. In consequence, since the occurrence of the repetition phenomenon is thus avoided, current ripple is not induced in a harness, such as the input wiring for the input voltage VB, the output wiring for the output voltage VTL, etc. Thus, occurrence of noise can be restrained.

Next, the construction of the step-down switching power supply circuit 20 shown in FIG. 6 will be described more in detail.

The control circuit 23 outputs a control voltage VC according to the voltage difference between the input voltage VB and the target voltage VS. If the voltage difference (VB−VS) is less than the predetermined constant value $\alpha$ provided that the constant value $\alpha$ is a positive constant, the control circuit 23 outputs +∞ as the control voltage VC. If the voltage difference (VB−VS) is greater than or equal to the constant value $\alpha$, the control circuit 23 outputs 0 as the control voltage VC. For example, in the case where the step-down switching power supply circuit 20 is a circuit that generates from the input voltage VB of 12 V the output voltage VTL that is variable in the range of 0 to 12 V, the control circuit 23 is able to effectively avoid the phenomenon of alternate repetitions of the continuous on-state and the switching state if the constant value $\alpha$ is set at 0.5 V.

Since the control circuit 23 changes the control voltage VC according to the voltage difference (VB−VS), the control circuit 23 may output the control voltage VC, for example, in accordance with a expression "VC=($\alpha$−(VB−VS))×N". In this expression, N is sufficiently larger than ($\alpha$−(VB−VS)). According to the expression "VC=($\alpha$−(VB−VS))×N", if (VB−VS)<$\alpha$, the control voltage VC is computed to be +∞, and if (VB−Vs)=$\alpha$, the control voltage VC is computed to be 0. Although if (VB−VS)>$\alpha$ the control voltage VC is computed to be −∞ according to the foregoing expression, the control circuit 23, due to the circuit construction, computes the control voltage VC to be 0 if (VB−VS)>$\alpha$.

The adder circuit 24 adds the control voltage VC to the target voltage VS input from outside, and outputs the thus obtained value as the input value VSI. When the control voltage VC is +∞, the input value VSI is +∞. When the control voltage VC is 0, the input value VSI is equal to the target voltage VS.

That is, due to the feedback loop by the output of the control circuit 23, as shown in FIG. 7, the output voltage VTL always converges to the input voltage VB if the difference in the subtraction of the target voltage VS from the input voltage VB is less than or equal to the constant value $\alpha$. On the other hand, if the difference in the subtraction of the target voltage VS from the input voltage VB is greater than the constant value $\alpha$, the output voltage VTL becomes equal to the target voltage VS (VTL=VS), so that the target voltage VS is directly output as the output voltage VTL.

Thus, according to the control circuit 23 and the adder circuit 24, when the difference in the subtraction of the target voltage VS from the input voltage VB is less than or equal to the constant value $\alpha$, the input value VSI can be caused to diverge to +∞, and therefore the duty ratio D can be fixed at a value (e.g., 100%) such that the output voltage VTL will be converged to the input voltage VB.

Figure 8:
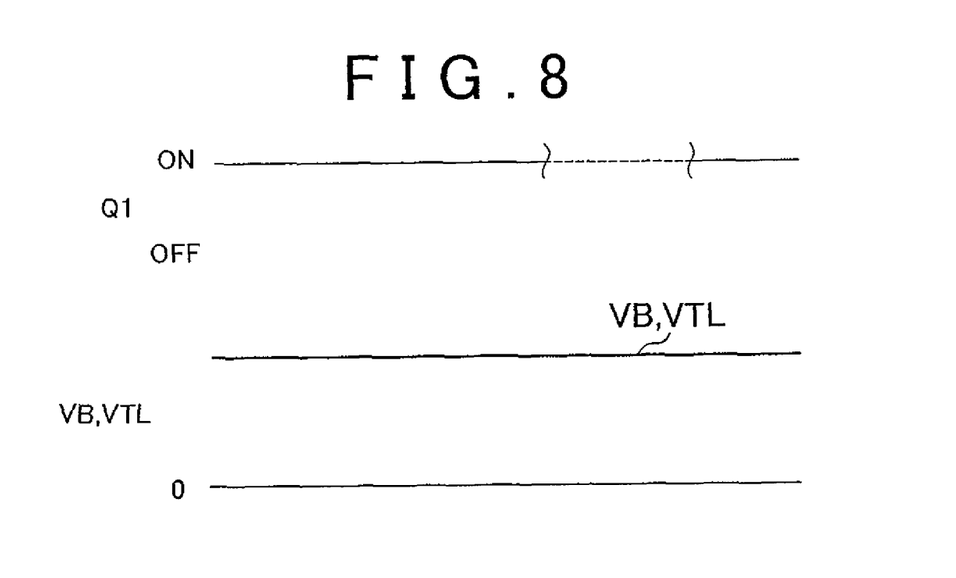

Therefore, even when there is input of such a target voltage VS that the difference in the subtraction of the target voltage VS from the input voltage VB becomes less than or equal to the constant value $\alpha$, the transistor Q1 is fixed at the on-state without entering into the switching state as shown in FIG. 8, because the output voltage VTL is controlled so as to be equal to the input voltage VB on that occasion. As a result, current ripple is not induced in a harness such as the input wiring for the input voltage VB, the output wiring for the output voltage VTL, etc., so that occurrence of noise can be restrained.

While the invention has been described with reference to example embodiments thereof; it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

For example, the fixation means for fixing the duty ratio D may fix the duty ratio D by adjusting the feedback value VFB regardless of the output voltage VTL, instead of adjusting the input value VSI.

Although in conjunction with the foregoing embodiments, the step-down switching power supply circuits are described as examples, the invention is also applicable to step-up (i.e., voltage step-up) switching power supply circuits.

Besides, although in FIG. 4 the output voltage VTL is controlled so as to converge to the value (VB−α), the output voltage VTL may also be controlled to a value that is slightly lower than the value (VB−α) provided that the slightly lower convergence value is within the demanded accuracy range of the output voltage VTL.

Figure 9:
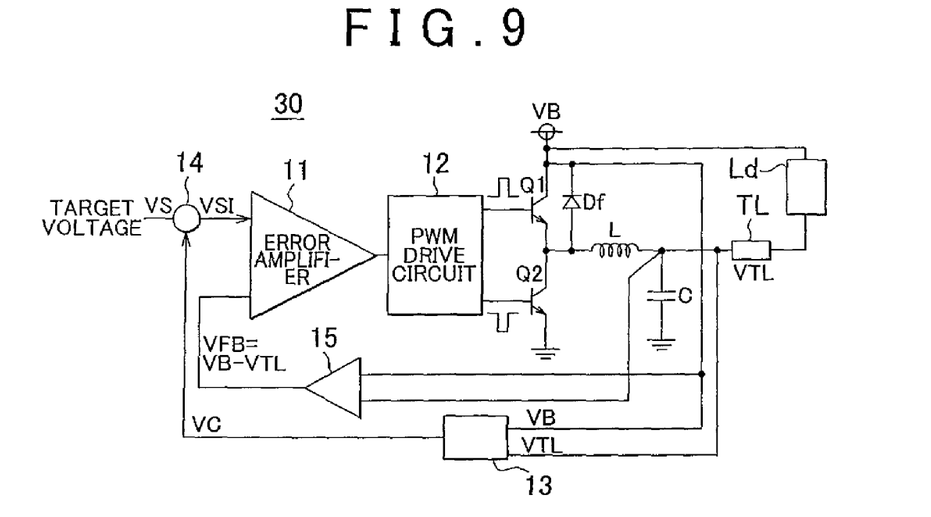
FIG. 9 is a diagram showing a construction of a step-down switching power supply circuit as a third embodiment of the switching power supply circuit of the invention.

Although the step-down switching power supply circuit 10 shown in FIG. 3 is described above as an example embodiment in which the load Ld is connected between the ground and the output terminal TL, a construction as shown in FIG. 9 in which the load Ld is connected between the input voltage VB and the output terminal TL is also conceivable as an embodiment of the invention. FIG. 9 is a diagram showing a construction of a step-down switching power supply circuit 30 as a third embodiment of the switching power supply circuit of the invention. Since the output voltage VTL in this case occurs between the input voltage VB and the output voltage VTL, it may suffice that the output voltage of the switching power supply circuit that needs to be fed back into the error amplifier 11 be the voltage difference (VB−VTL) in the subtraction of the output voltage VTL from the input voltage VB. Besides, corresponding to the pull-up of the load Ld by the output voltage VB, the flyback diode Df is connected in parallel with a switching element Q1 instead of a switching element Q2. Therefore, in this embodiment, contrary to the embodiment shown in FIG. 3, the switching element Q2 is driven as a main switching element and the switching element Q1 is driven for synchronous rectification.

That is, the step-down switching power supply circuit 30 is equipped with a PWM drive circuit 12 as means for PWM driving the switching element Q2 at a duty ratio D that is determined according to the error ERR between the feedback value VFB based on the output voltage VTL (the value VFB is equal to a value obtained by amplifying the difference (VB−VTL) by a differential amplifier 15 in the circuit shown in FIG. 9) and the input value VSI based on the target voltage VS. The other constructions of the step-down switching power supply circuit 30 as well as the manners of operation and the effects thereof are substantially the same as those of the step-down switching power supply circuit 10 shown in FIG. 3, and the description thereof will be omitted.

Figure 10:
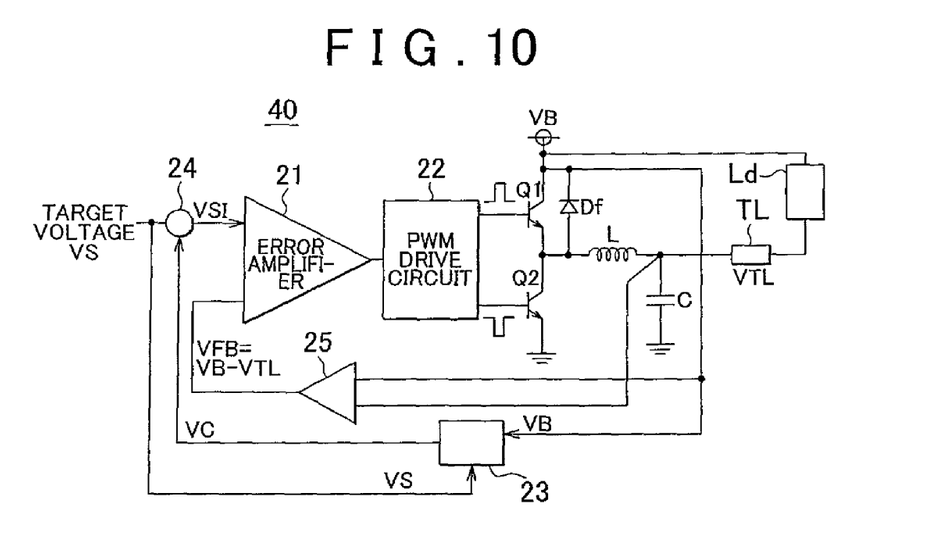
FIG. 10 is a diagram showing a construction of a step-down switching power supply circuit as a fourth-embodiment of the switching power supply circuit of the invention.

Besides, while the step-down switching power supply circuit 40 shown in FIG. 6 is described above as an example embodiment of the invention in which the load Ld is connected between the ground and the output terminal TL, a construction as shown in FIG. 10 may be presented as an embodiment of the invention in which the load Ld is connected between the input voltage VB and the output terminal TL. FIG. 10 is a diagram showing a construction of a step-down switching power supply circuit 40 as a fourth embodiment of the switching power supply circuit of the invention. Since the output voltage VTL in this case occurs between the input voltage VB and the output voltage VTL, it may suffice that the output voltage of the switching power supply circuit that needs to be fed back into an error amplifier 11 be the voltage difference (VB−VTL) in the subtraction of the output voltage VTL from the input voltage VB. Besides, corresponding to the pull-up of the load Ld by the output voltage VB, the flyback diode Df is connected in parallel with a switching element Q1 instead of a switching element Q2. Therefore, in this embodiment, contrary to the embodiment shown in FIG. 6, the switching element Q2 is driven as a main switching element and the switching element Q1 is driven for synchronous rectification.

That is, the step-down switching power supply circuit 40 is equipped with a PWM drive circuit 22 as means for PWM driving the switching element Q2 at a duty ratio D that is determined according to the error ERR between the feedback value VFB based on the output voltage VTL (the value VFB is equal to a value obtained by amplifying the difference (VB−VTL) by a differential amplifier 25 in the circuit shown in FIG. 10) and the input value VSI based on the target voltage VS. The other constructions of the step-down switching power supply circuit 40 as well as the manners of operation and the effects thereof are substantially the same as those of the step-down switching power supply circuit 20 shown in FIG. 6, and the descriptions thereof will be omitted.

The invention claimed is:

1. A switching power supply circuit comprising:
a drive portion that drives a switching element at a duty ratio commensurate with a target voltage, wherein the switching power supply circuit operates as a voltage step-down switching power supply circuit to generate from an input voltage an output voltage whose target value is the target voltage, by the drive portion driving the switching element; and
a fixation portion that maintains the duty ratio constant regardless of the target voltage, when a difference value between the input voltage and the target voltage is less than or equal to a predetermined set value,
so that the difference value converges to a constant value that is less than or equal to the predetermined set value.

2. A control method for a voltage step-down switching power supply circuit that includes a drive portion that drives a switching element at a duty ratio commensurate with a target voltage, and that generates from an input voltage an output voltage whose target value is the target voltage, by the drive portion driving the switching element, the control method comprising:
maintaining the duty ratio constant regardless of the target voltage, when a difference between the input voltage and the target voltage is less than or equal to a predetermined set value,
so that the difference between the input voltage and the output voltage converges to a constant value that is less than or equal to the predetermined set value.

3. The switching power supply circuit according to claim 1, wherein the constant value is equal to the predetermined set value.

4. The switching power supply circuit according to claim 1, wherein the constant value is equal to zero.

5. The switching power supply circuit according to claim 1, wherein the upper limit of the output voltage converges to a value obtained by subtracting the constant value from the input voltage.

6. The switching power supply circuit according to claim 1, further comprising an inductor connected to the switching element.

7. The switching power supply circuit according to claim 6, wherein:
the switching element is disposed at a high side in the switching power supply circuit;

the switching power supply circuit further comprises a second switching element disposed at a low side in the switching power supply circuit; and the inductor is connected to a connection between the switching element and the second switching element.

8. The switching power supply circuit according to claim 1, wherein the fixation portion fixes the duty ratio regardless of the target voltage, when the difference between the input voltage and the target voltage is substantially zero.

9. The switching power supply circuit according to claim 1, wherein:
   the duty ratio is determined according to an error between a feedback value based on the output voltage and an input value based on the target voltage; and
   the fixation portion fixes the duty ratio by adjusting the input value regardless of the target voltage.

10. The switching power supply circuit according to claim 1, wherein the switching power supply circuit generates the output voltage through step-down voltage conversion of the input voltage by driving the switching element to lower the input voltage.

11. The switching power supply circuit according to claim 1, wherein the fixation portion includes a control circuit that receives the input voltage and the output voltage, determines whether a difference value between the input voltage and the output voltage is less than a predetermined constant value, and generates a control voltage based on a result of the determination, and a target voltage limiting circuit that receives the control voltage and the target voltage and adjusts an upper limit of the target voltage based on the control voltage.

* * * * *